US006493847B1

(12) United States Patent
Sorgi et al.

(10) Patent No.: US 6,493,847 B1
(45) Date of Patent: Dec. 10, 2002

(54) SONET B2 PARITY BYTE CALCULATION METHOD AND APPARATUS

(75) Inventors: Alan M. Sorgi, San Diego, CA (US); Scott A. Applebaum, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 09/334,170

(22) Filed: Jun. 15, 1999

(51) Int. Cl.[7] .......................... G06F 11/00; H04L 12/28
(52) U.S. Cl. ........................................ 714/800; 370/907
(58) Field of Search ................................ 714/700–824; 379/1.03–1.33; 370/476, 907

(56) References Cited

U.S. PATENT DOCUMENTS

| | | | | |
|---|---|---|---|---|
| 4,430,737 A | * | 2/1984 | Beranger et al. | 714/801 |
| 4,546,241 A | | 10/1985 | Walton | 235/380 |
| 4,698,806 A | | 10/1987 | Graves et al. | 370/100 |
| 4,698,814 A | | 10/1987 | Verheul et al. | 371/49 |
| 4,835,768 A | | 5/1989 | Hubbard et al. | 370/106 |
| 5,185,736 A | * | 2/1993 | Tyrrell et al. | 370/758 |
| 5,257,261 A | | 10/1993 | Parruck et al. | 370/84 |
| 5,455,832 A | | 10/1995 | Bowmaster | 371/20.1 |
| 5,555,248 A | | 9/1996 | Sugawara | 371/5.1 |
| 5,594,862 A | * | 1/1997 | Winkler et al. | 714/5 |
| 5,675,585 A | * | 10/1997 | Bonnot et al. | 714/701 |
| 5,764,651 A | | 6/1998 | Bullock et al. | 714/708 |
| 5,872,780 A | * | 2/1999 | Demiray et al. | 370/359 |
| 5,905,585 A | * | 5/1999 | Shirai | 359/110 |
| 5,923,653 A | * | 7/1999 | Denton | 370/375 |

FOREIGN PATENT DOCUMENTS

EP    0 499 365 A2 * 8/1992 ........... G06F/11/20

* cited by examiner

*Primary Examiner*—Albert Decady
*Assistant Examiner*—Cynthia Britt
(74) *Attorney, Agent, or Firm*—Gray Cary Ware & Freidenrich

(57) ABSTRACT

The invention is directed to a technique for recalculating a bit interleave parity (BIP) byte for byte interleaved SONET/SDH frames. An interleaved SONET/SDH frame consists of a plurality (N) of base STS-1 frames that are byte interleave multiplexed. Each STS-1 frame contains transport overhead bytes, including a BIP byte (B2) and a remote error indication byte (M1). The M1 byte is associated with error over an entire interleaved STS-N frame and not a particular individual STS-1 frame. Each B2 byte is associated with a particular STS-1 frame and is calculated over selected overhead bytes, including the M1 byte, and all of the payload bytes of the previous STS-1 frame. When SONET frames are multiplexed, the M1 byte values are changed and the B2 parity calculations for each STS-1 frame must be updated. Existing systems generally update the affected B2 bytes by performing the B2 parity calculation over all of the respective overhead bytes and payload bytes for each frame. The techniques of the invention calculates the updated B2 byte using the original and modified M1 and B2 bytes of each affected STS-1 frame. The original B2 byte of the previous frame is EXORed with the affected B2 byte and the result is EXORed with the new B2 byte. The original and modified M1 bytes are likewise EXORed to update the affected B2 byte of the next frame. As a result, the number of EXOR calculations is greatly reduced.

19 Claims, 8 Drawing Sheets

*: C1 value defaults to 01 but can be programmed to be the 16 or 64 type section trace message.
**: B1, B2 values depend on payload contents
***: value depends on incoming line bit errors. When not configured for STS-1, the first Z2 byte has a default value of 00.

FIG. 2B

STS-12 (STM-4) Default Transport Overhead Values

SONET B2 PARITY BYTE CALCULATION METHOD AND APPARATUS

BACKGROUND OF THE INVENTION

The present invention relates to digital communications, and more particularly, to the calculation of parity bytes for frames of digital data in a synchronous communication system. The invention is advantageous for reducing the number of parity calculations that must be performed when data frames are multiplexed or similarly modified.

Synchronous communication systems organize digital data into frames having a predetermined format for transmission across a data link. It is often advantageous to use parity calculations for monitoring bit errors occurring in transmissions across the data link. In standard synchronous communication systems (e.g. SONET Bellcore GR-253 or SDH G.707), a bit interleaved parity byte, designated B2, is calculated for each basic data frame. The B2 byte calculation is generally calculated over nearly the entire frame and any changes to a frame's data bytes necessitates the recalculation of the B2 byte. When the basic data frames are multiplexed into higher data rate frames, the transport overhead bytes are changed in certain frame locations and the associated B2 bytes must be recalculated.

Accordingly, there exists a definite need for a technique for efficiently implementing the recalculation of parity bytes in digital communication systems. The present invention satisfies these needs and provides further related advantages.

SUMMARY OF THE INVENTION

The present invention provides apparatus, and related methods, for recalculating parity bytes after multiplexing, or similar modification, of frames of digital data in a synchronous communication system. The parity byte calculation technique of the invention greatly reduces the number of parity byte calculations that must be performed when data frames are multiplexed.

The invention is embodied in a method for recalculating a parity byte value related to a frame of synchronous digital data after change to at least one data byte value in the frame from an original data byte value to a new data byte value when the parity byte's original value resulted from exclusive OR calculations that included the original data byte value. The parity byte value is recalculated by performing, on the original parity byte value, exclusive OR calculations with the original data byte value and with the new data byte value to generate an updated parity byte value. The method of the invention is particularly advantageous for recalculating B2 parity bytes after multiplexing of, for example, four OC-12 SONET data frames into an OC-48 SONET data frame.

Another embodiment of the invention resided in a method, and related apparatus, for multiplexing four OC-12 signals into a single OC-48 signal of framed data bytes for synchronous communication over an optical fiber link. First, the four OC-12 signals are byte interleave multiplexed into the OC-48 signal. The B2 and M1 data bytes of frames of the OC-48 signal are replaced based on B2 and M1 data bytes of the four OC-12 signals. A new B2 byte is determined by performing, on the B2 byte's initial value, exclusive OR calculations with the initial and resulting B2 bytes of the previous frame and further with the initial and resulting M1 bytes of the previous frame.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 2B shows the byte location mapping of the transport overhead portion of bytes of an STS-12/STM-4 (SONET OC-12) frame.

DETAILED DESCRIPTION OF THE PREFERRED EMBODIMENTS

The present invention provides apparatus, and related methods, for recalculating parity bytes after multiplexing frames of digital data in a synchronous communication system. The parity byte calculation technique of the invention greatly reduces the number of parity byte calculations that must be performed when data frames are multiplexed or similarly modified. The reduction of the number of parity byte calculations allows the use of lower power (slower) digital circuits for recalculating the parity bytes.

Figure 1:
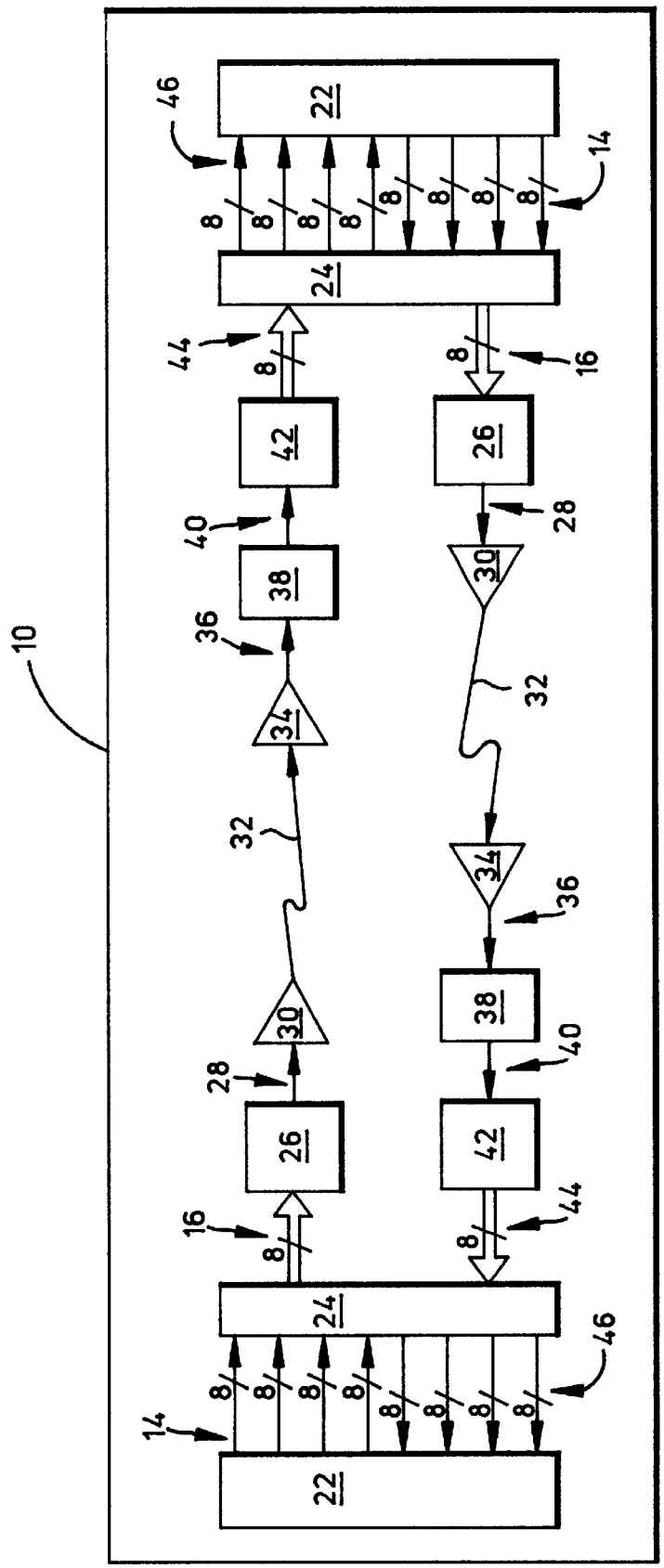
FIG. 1 is a block diagram of a digital communication system for multiplexing/demultiplexing four channels of framed synchronous data for serial transmission across an optical fiber.

A synchronous communication system 10 based on the Synchronous Optical Network (SONET) standard is shown in FIG. 1. SONET is a standard for connecting one optical fiber system to another at the optical level. SONET, together with the Synchronous Digital Hierarchy (SDH) administered by the ITU, forms a single international standard for optical fiber interconnects between telephone and data networks of different countries. SONET is capable of accommodating a variety of transmission rates and applications. The communication system receives parallel serial-data-channels operating at a lower data rate and byte interleave multiplexes the data signals into one higher data rate channel for transmission through an optical fiber. A return path is also included for two-way communications.

The data rates and signals designations of the SONET hierarchy is shown in Table 1 below:

TABLE 1

| SONET Signal Hierarchy | | | |
| --- | --- | --- | --- |
| Electrical | CCITT | Optical | Data Rate (Mbps) |
| STS-1 |  | OC-1 | 51.84 |
| STS-3 | STM-1 | OC-3 | 155.52 |
| STS-12 | STM-4 | OC-12 | 622.08 |
| STS-24 | STM-8 | OC-24 | 1244.16 |
| STS-48 | STM-16 | OC-48 | 2488.32 |
| STS-96 | STM-32 | OC-98 | 4976.64 |

Figure 2A:
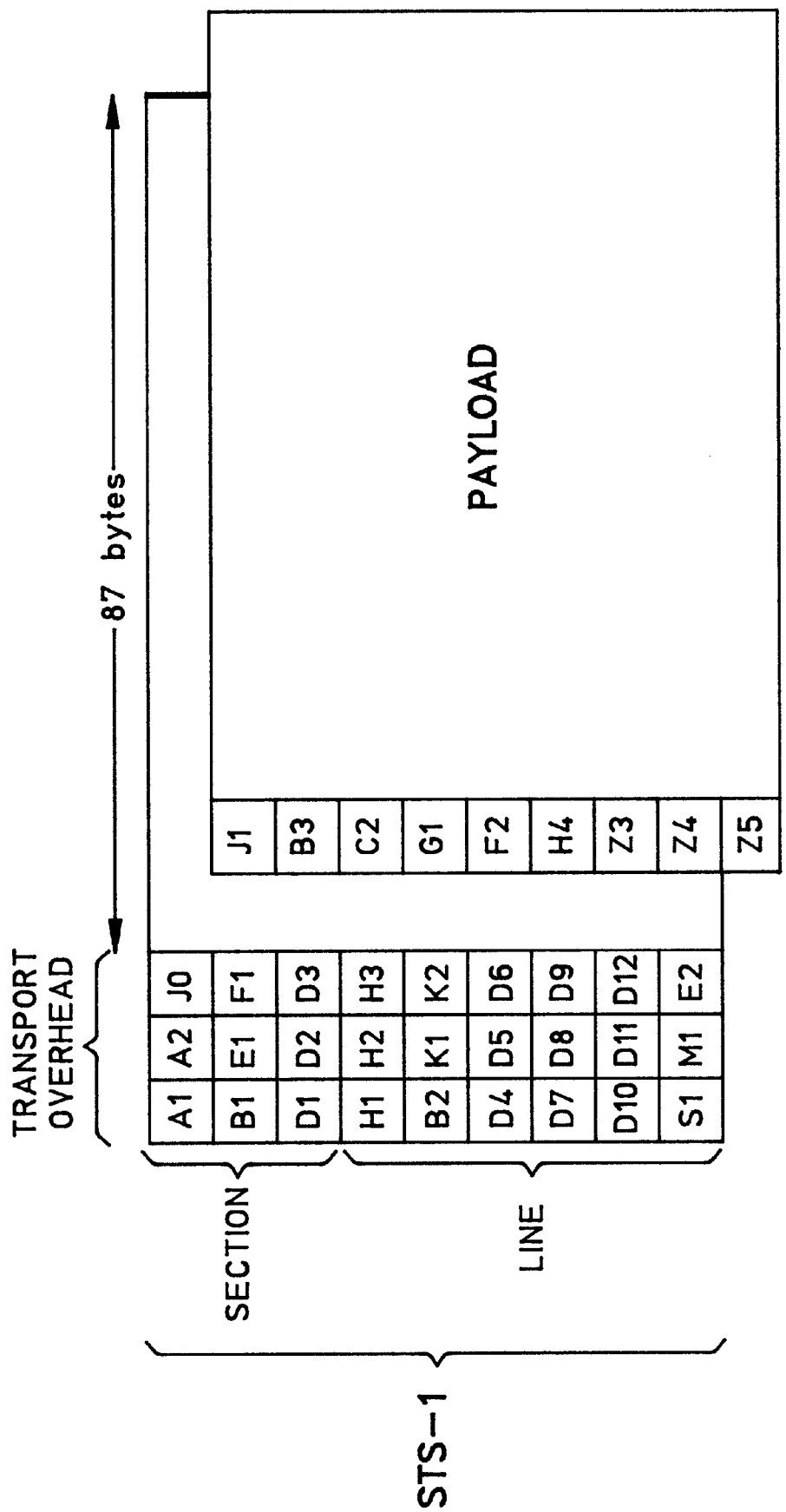
FIG. 2A shows the byte location mapping of an STS-1 frame having a transport overhead portion of bytes and a payload portion of bytes.

The fundamental SONET/SDH frame format is the Synchronous Transport Signal level-1 (STS-1) which is shown in FIG. 2A. As discussed in more detail below, an STS-N signal is formed of N byte-interleaved STS-1 signals. The optical counterpart of the STS-N signal is the optical carrier level-N (OC-N) signal. The STS-1 frame consists of 810 8-bit bytes mapped into 90 columns and 9 rows. The transmission interval between frames is 125 microseconds. The first 3 columns contain the transport overhead bytes and the remaining 87 columns contain the payload bytes.

The synchronous communication system shown in FIG. 1 provides bi-directional communications over two unidirectional optical fiber links. Each link takes four OC-12 signals 14 and multiplexes these signals into a single OC-48 signal 16. The OC-12 signals are each provided through a network interface or processor 22 such as part number PM5355 available from PMC-Sierra, Inc. of Burnaby, British Columbia, Canada. The four OC-12 signals are multiplexed into an OC-48 signal by a byte interleave device 24 such as part number S3045 available from Applied Micro Circuits Corporation (AMCC) of San Diego, Calif. The bytes are serialized by an 8:1 transmitter or serialization device 26, such as part number S3041 also available from AMCC, that generates a serialized OC-48 signal 28. The serial data signal is converted to optical light signals by an optical transmitter 30 and the light signals are coupled into an optical fiber 32. At the other end of the optical fiber is an optical receiver 34 that converts the light signals to serial electrical data signals 36. A clock recovery device 38 (e.g., AMCC part number S3040) recovers a timing signal from the serial data signal. The serial data signals 40 are converted to parallel data bytes by a deserialization interface device 42 (e.g., AMCC part number 3042) that also performs byte alignment and frame detection. The parallel data bytes are associated with an OC-48 data frame. The OC-48 parallel data bytes 44 are byte interleave demultiplexed to four OC-12 signals 46 by the byte interleave device 24 (e.g., AMCC part number S3045). The four OC-12 signals are provided to the network interface 22.

The overhead bytes of an STS-N signal each have a specific designation and function defined in the SONET specification. The overhead bytes designated as the B2 and M1 bytes will be specifically described to facilitate understanding the present invention. The B2 byte is located in the STS-1 frame at row 5, column 1. The B2 byte provides line error monitoring and contains a section bit interleaved parity code (BIP-8) that uses even parity to detect and indicate transmission errors over a transmission line. The BIP-8 byte is calculated over all of the line overhead and the payload envelope bytes of a previous STS-N frame before scrambling and then is placed in the B2 byte location of the current STS-1 frame before scrambling. The B2 byte is determined for each STS-1 frame of an STS-N signal. The calculation of the B2 parity byte is performed over most of the frame and involves about 800 byte parity calculations for each STS-1 frame. Thus, calculation of the 48 B2 parity bytes 10 in an STS-48 frame requires a large number of EXOR calculations (about 38,000).

Figure 3A:
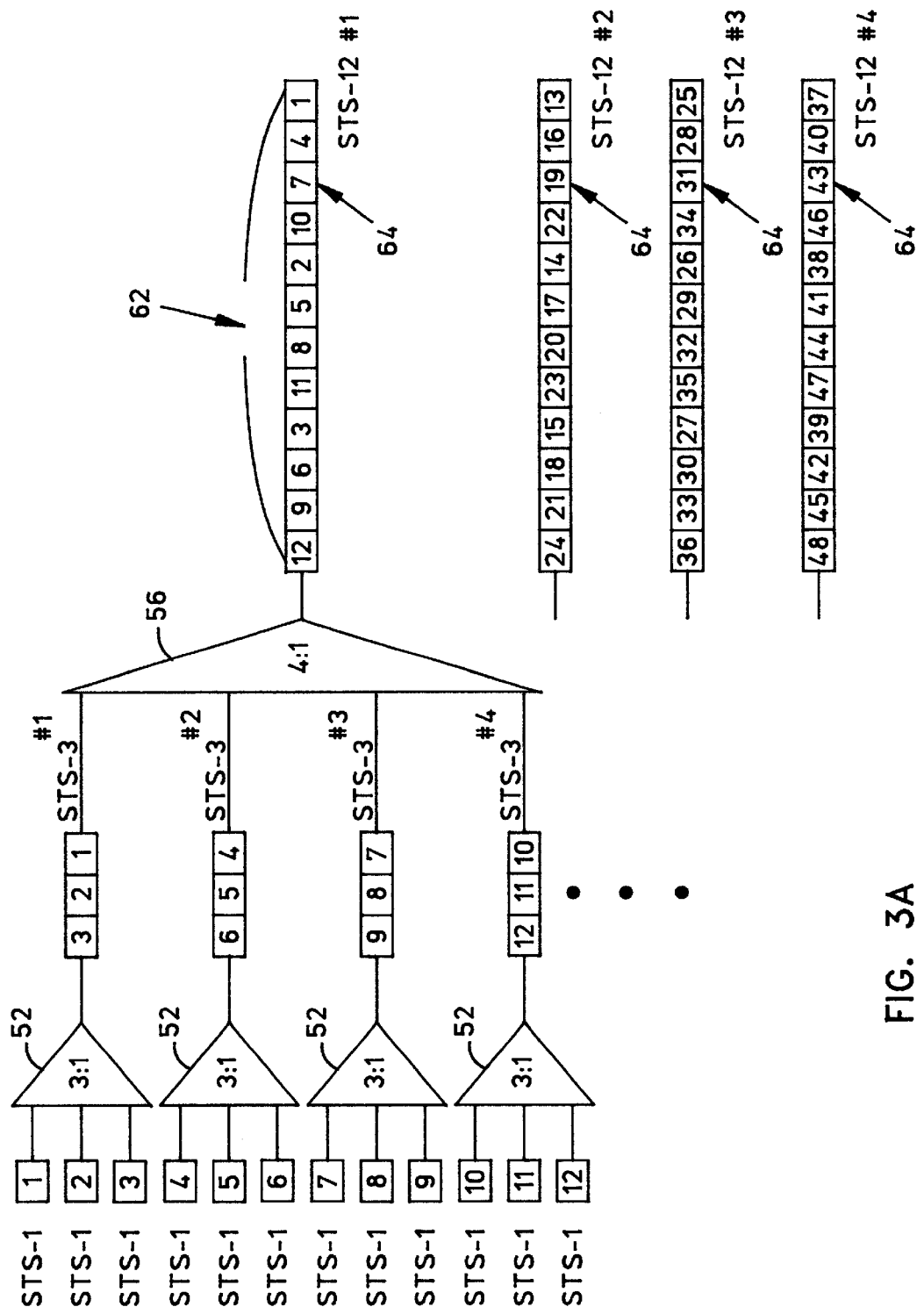
FIGS. 3A and 3B are data-flow block diagrams showing the interleave mapping of 48 STS-1 signals into an STS-48 signal.

The M1 byte is located at row 9, column 2 in the third STS-1 (in order of appearance) in an STS-N (N>=3) signal and is used for a remote error indication function. The M1 byte indicates errors detected by a receiving node and is returned to the transmitting node. As shown in FIG. 3A, the STS-1 bytes are generally interleaved into the corresponding locations in an STS-12 frame by a two-stage multiplexing process. First, groups of three STS-1 frames are byte interleave multiplexed into single STS-3 frames. A 3:1 multiplexer 52 takes one byte from each STS-1 signal so that the bytes are interleave multiplexed in a repetitive 1, 2, 3 order, etc. Next, four STS-3 frames are byte interleave multiplexed into a single STS-12 frame. A 4:1 multiplexer 56 takes one byte frame each STS-3 signal so that the bytes are interleave multiplexed in a repetitive order. The first byte of the resulting STS-12 frame number 1 is from STS-3 frame number 1 and corresponds to STS-1 frame number 1; the second byte of STS-12 frame number 1 is from STS-3 frame number 2 and corresponds to STS-1 frame number 4, etc. Accordingly, as shown in FIG. 3A, bytes from the STS-1 signals are interleaved in a repetitive 1, 4, 7, 10 . . . order 62 in the first STS-12 signal. Similar byte interleave multiplexing generates three other STS-12 signals.

The transport overhead byte portion of an STS-12 frame is shown in FIG. 2B. The frame interval remains 125 microseconds. The M1 byte is shown in the third locations 64 of the STS-12 frame bytes at row 9, column 2. This corresponds to the third STS-1 location of the STS-12 frames of FIG. 3A.

Figure 3B:
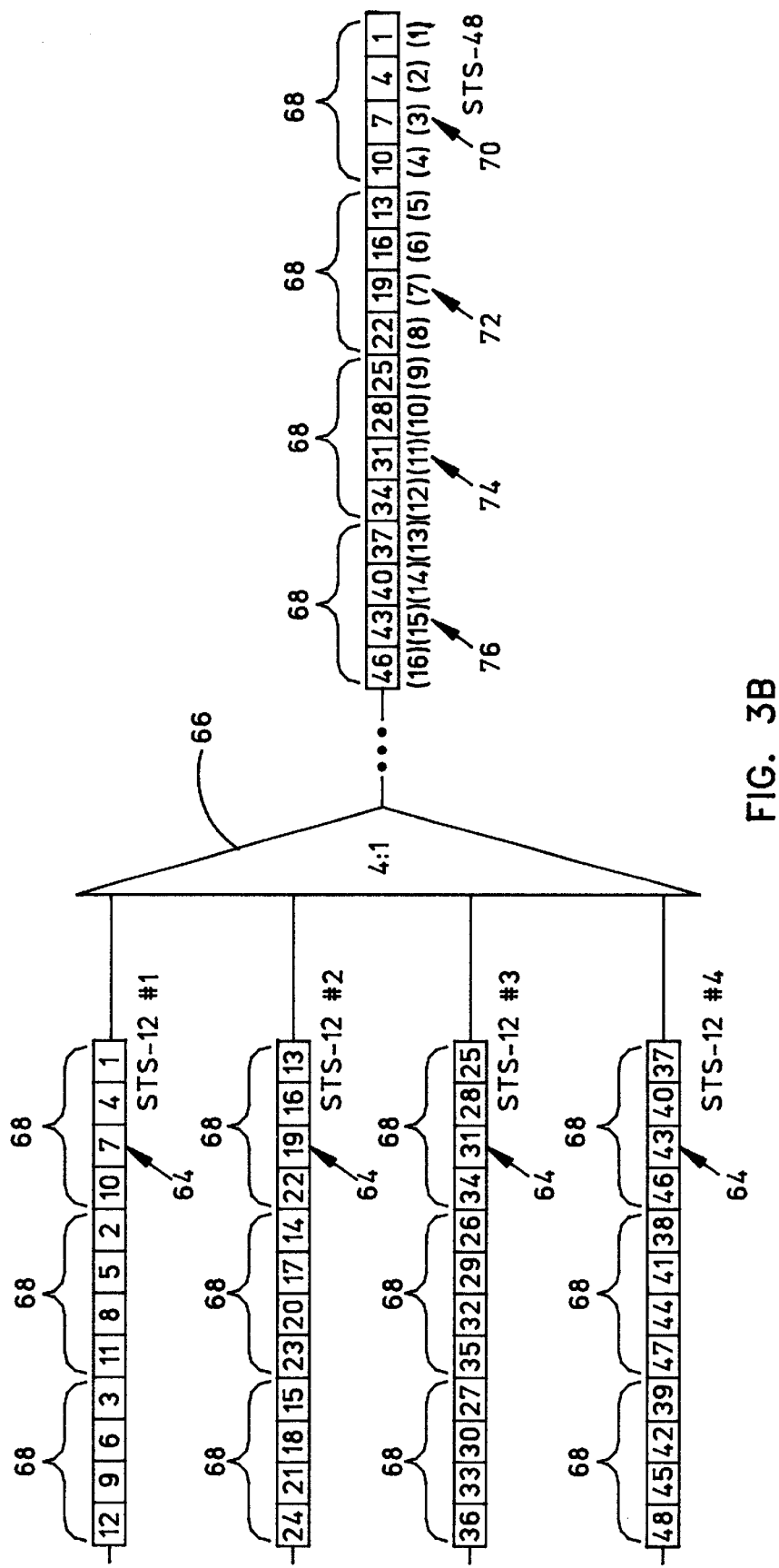

As shown in FIG. 3B, groups of four STS-12 signals may be combined to form a single STS-48 frame. A second 4:1 multiplexer 66 takes four byte groups 68 from each STS-12 signal to generate a byte interleave pattern as shown in FIG. 3B. As a result, the STS-1 frames containing the STS-12 M1 bytes are located in STS-48 locations 3, 7, 11 and 15 which correspond to STS-1 numbers 7, 19, 31 and 43 indicated by reference numbers 70, 72, 74 and 76, respectively.

Figure 2C:
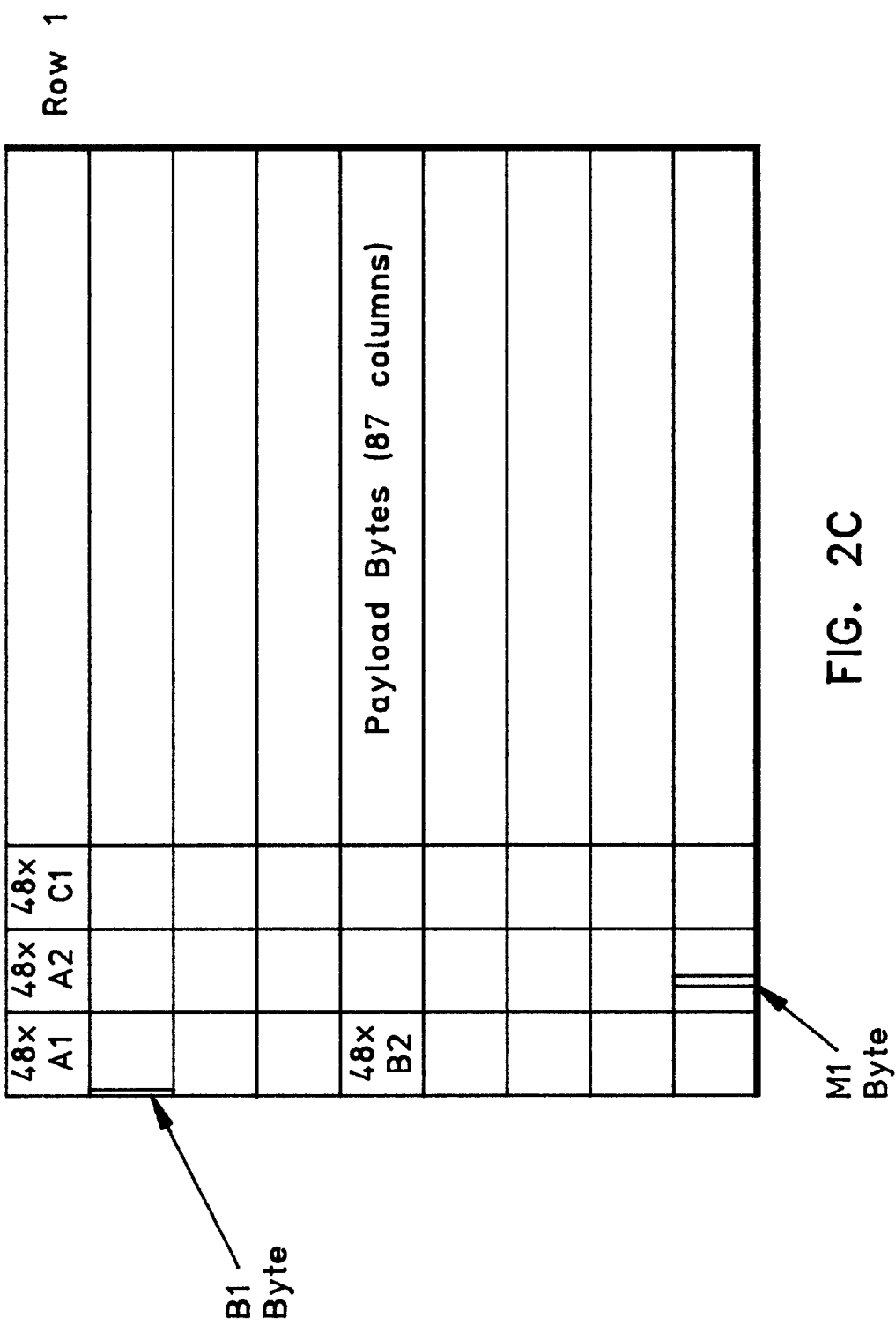
FIG. 2C shows the byte location mapping of an STS-48/STM-16 (SONET OC-48) frame.

An STS-48 frame is shown in FIG. 2C. The frame interval remains 125 microseconds and the STS-1 bytes are interleaved into the corresponding locations in the STS-48 frames. The STS-48 frame has 48 B2 bytes and only one M1 byte.

Figure 4:
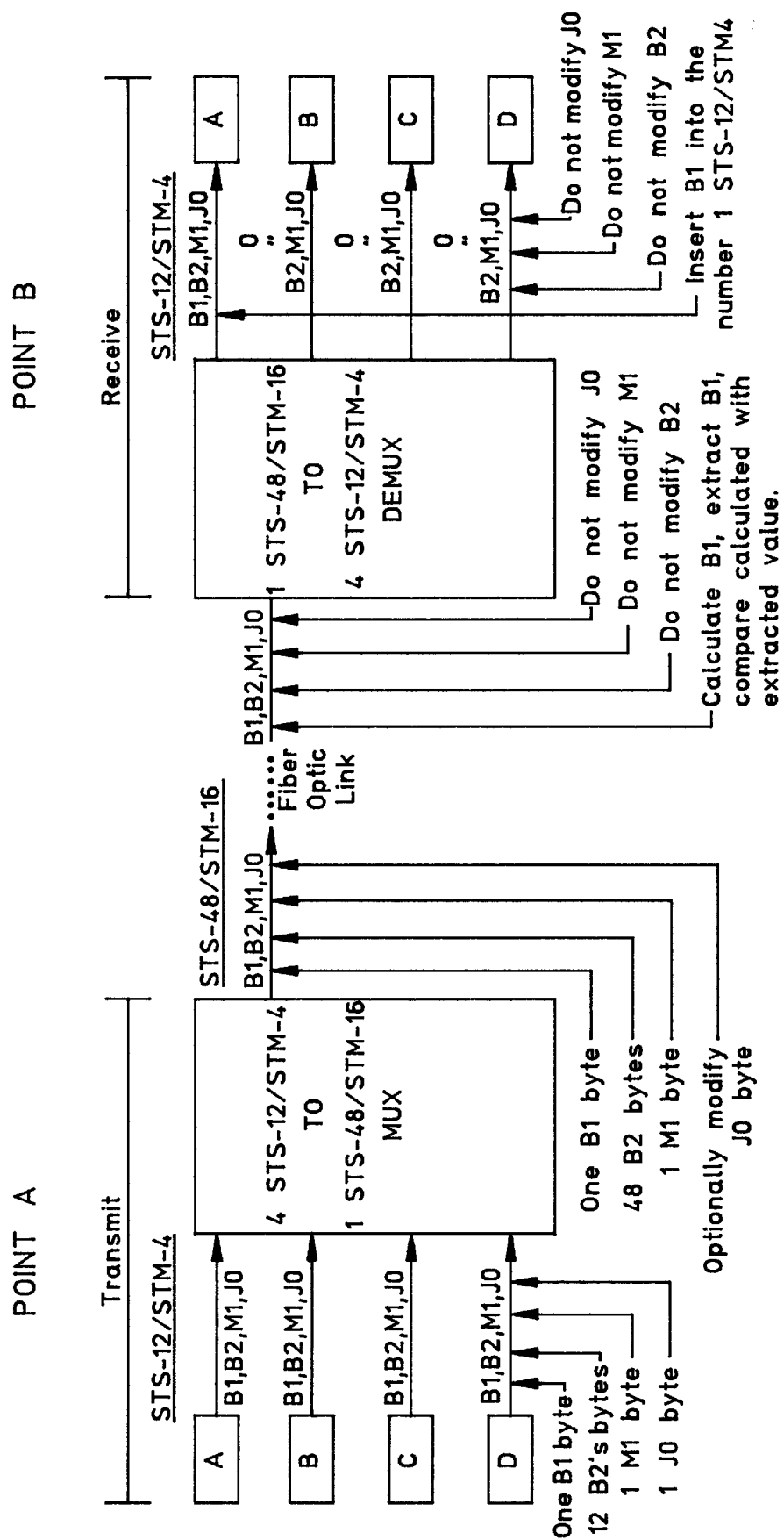
FIG. 4 is a block diagram showing select overhead byte mapping between a transmitting point A and a receiving point B representing a data link in accordance with FIG. 1.

The transmission of the four OC-12 across the OC-48 link from Point A to Point B and the alteration of the transport overhead bytes is shown in FIG. 4. Each STS-12 frame has one B1 byte, 12 B2 bytes, one M1 byte and one J0 byte. Each STS-48 signal has one B1 byte, 48 B2 bytes, one M1 byte and one J0 byte. The B1 byte is calculated over the STS-48 frame after the changes to the B2 and M1 bytes discussed below. The J0 byte alteration is optional.

The M1 byte in the STS-48 frame is the summation of values of the M1 bytes of the four STS-12 frames truncated at a maximum value of 255. The summation value is placed in the third STS-1 location of the STS-48 frame. The other M1 values are set of zero after the calculation. The changing of the M1 values requires recalculation of the corresponding B2 values in the STS-1 frames corresponding to the altered M1 values.

After transmission across the data link, the B2, M1 and J1 bytes are not modified and the B1 byte is compared with a parity value calculated over the received frame. If no errors are detected, the B1 over the first STS-12 frame is calculated and inserted in the first STS-12 frames. The B1 bytes for the other STS-12 frames are ignored. If errors are detected, a bit error flag B1ERR is asserted and the number of errors found in the B1 comparison for the STS-48 frame inserted into the appropriate location of the first STS-12 frame. After demultiplexing, the B2 and J0 bytes are not modified. The M1 bytes are not modified from the sent or transmitted values such that the M1 value of the first STS-12 frame is the total count and the M1 values of the other three STS-12 frames are zero.

The sequence equations for the B2 byte recalculations and the M1 byte calculations are shown below:

$$B2_t(m,n) = B2_i(m,n) \oplus [B2_i(m,n-1) \oplus B2_t(m,n-1)] \oplus [M1_i(m,n-1) \oplus M1_t(m,n-1)] \quad \text{Eqn. 1}$$

for m=3, 7, 11, 15;

$$M1_r(3,n)=M1_i(3,n)+M1_i(7,n)+M1_i(11,n)+M1_i(15,n) \qquad \text{Eqn. 2}$$

and $$M1_r(7,n)=M1_r(11,n)=M1_r(15,n)=0 \qquad \text{Eqn. 3}$$

where i is the initial value, r is the resulting value after the byte recalculations, m=the frame location number (OC-48), n=the frame number. For n≦0, all values are assumed to be zero.

A table with sample values is provided below:

TABLE 1

|   | n = 1 | | | | n = 2 | | | | n = 3 | | | |
|---|---|---|---|---|---|---|---|---|---|---|---|---|
|   | B2 | | M1 | | B2 | | M1 | | B2 | | M1 | |
| m | i | r | i | r | i | r | i | r | i | r | i | r |
| 3 | 1 | 1 | 1 | 7 | 1 | 7 | 2 | 6 | 3 | 1 | 0 | 7 |
| 7 | 2 | 2 | 2 | 0 | 2 | 0 | 1 | 0 | 2 | 1 | 2 | 0 |
| 11 | 2 | 2 | 1 | 0 | 2 | 3 | 1 | 0 | 2 | 2 | 2 | 0 |
| 15 | 1 | 1 | 3 | 0 | 3 | 0 | 2 | 0 | 1 | 0 | 3 | 0 |

In the first OC-48 frame (n=1), the B2 values do not change and the initial M1 values are summed to generate the M1 value for m=3 and the remaining M1 values (m=7, 11, 15) are set to zero. In the next OC-48 frame (n=2), the B2 value is determined in accordance with the technique of the present invention.

The initial B2 value is the result of over 800 parity byte calculations for each respective STS-1 frame. The resulting value of an exclusive OR (EXOR) of a set of bytes is independent of the calculations order. An additional property of an EXOR calculation is that EXORing a number with a resulting value of a previous EXOR with the number effectively removes the effect of the previous EXOR with the number. For example, the EXOR of 2, 3 and 7 is equal to 6. The EXOR of 7 with 6 (6 is the result of the EXOR calculation of the three bytes) is equal to 1 which effectively removes the 7 value from the EXOR value of the three bytes given that the EXOR of 2 and 3 is equal to 1. Likewise, the EXOR of 3 and 1 yields 2.

Similarly, the new B2 byte, $B2_r(m,n)$, is determined by EXORing the initial B2 byte, $B2_i(m,n)$, with the EXOR of the initial and resulting B2 bytes of the previous frame, $B2_i(m,n-1)$ and $B2_r(m,n-1)$, respectively, and further EXORing it with the EXOR of the initial and resulting M1 bytes of the previous frame, $M1_i(m,n-1)$ and $M1_r(m,n-1)$, respectively. As mentioned before, the order of the EXOR calculation has no effect on the resulting value of the EXOR of a set of bytes and thus the brackets shown in Equation 1 are shown merely for ease of understanding and do not indicate any required order of calculation. Thus, each affected B2 byte may be recalculated by merely performing four EXOR recalculations rather than performing over 800 EXOR calculations as required by existing systems.

Returning to Table 1, the $B2_r$ values for the second frame (n=2) are calculated in accordance with Equation 1 and the $M1_i$ values and changed in accordance with Equations 2 and 3. For the next frame (n=3), the calculations are repeated in accordance with Equations 1, 2 and 3. These steps are repeated for subsequent data frames.

Although the byte values shown in Table 1 are less than 8, a typical byte size is eight bits which are capable of representing integer numbers up to 255. The present invention is not limited to any particular byte configuration and may be applied to a wide variety of byte and bit configurations.

Figure 5:
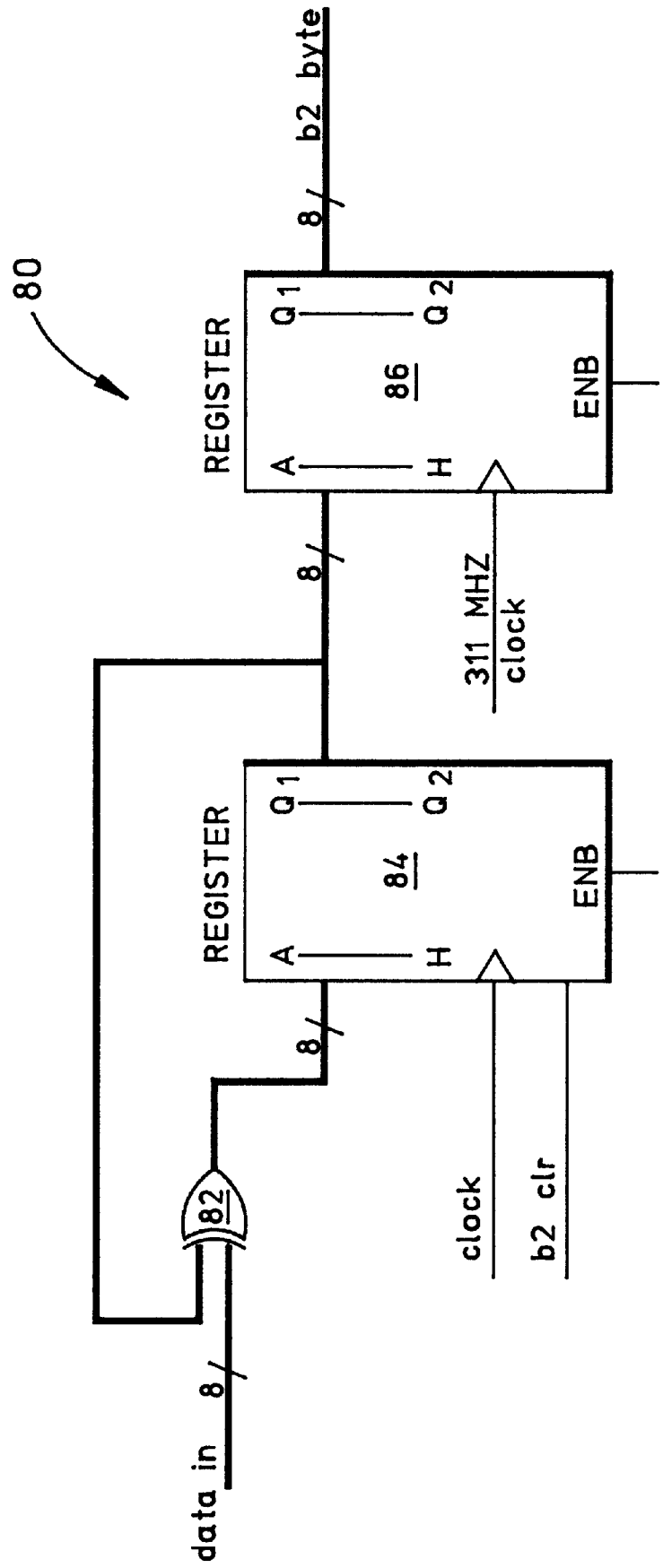
FIG. 5 is a block diagram of a byte parity calculator.

A representative digital circuit for performing the byte parity calculations is shown in FIG. 5. Generally, one circuit is needed for each affected STS-1 requiring B2 byte recalculation so for an OC-48 frame, the circuit is replicated four times. In existing devices, the circuit may be replicated many times occupying a substantial chip area of a semiconductor device. Also, because of the reduction of required byte parity recalculations, the digital circuits may be implemented in low-power circuits, such as CMOS, operating at a rate substantially below the synchronous data rate.

The byte parity calculator 80 of FIG. 5 has an 8-bit exclusive OR (EXOR) gate 82, a first or cumulation register 84, and a second or output register 86. The byte parity calculator receives 8-bit data bytes on a line "data-in" and outputs 8-bit data bytes on a line b2_byte. The first register receives a clear signal on a line b2_clr for initializing the first register to zero. The first and second registers also receive a clock signal on the respective clock lines and respective enable signals on the respective lines ENB. For an OC-48 signal, a clock frequency of about 311 MHz is provided. The data bytes are provided to one input of the EXOR gate and a parity cumulation byte for the first register is provided to another input of the EXOR gate. The output of the EXOR gate is stored in the first register. Once the byte parity calculation has been completed on the group of incoming data bytes, the result is stored in the second register for output. The selection and replacement of the B2 and M1 data bytes is handled by framing and byte extraction/replacement circuits (not shown).

The byte parity recalculation techniques of the invention greatly reduce the number of required EXOR calculations which may reduce the associated power consumption, particularly for CMOS devices. Also, the byte parity recalculation devices may operate at a rate below the synchronous data rate. The byte parity recalculation technique of Equations 1, 2 and 3 may be implemented in software or in application specific hardware derived using logic and components defined in a hardware definition language such as Verilog or the like.

While the foregoing has been with reference to specific embodiments of the invention, it will be appreciated by those skilled in the art that these are illustrations only and that changes in these embodiments can be made without departing from the principles of the invention, the scope of which is defined by the appended claims.

We claim:

1. Method for recalculating a parity byte value related to a frame of synchronous digital data after change to at least one data byte value in the frame from an original data byte value to a new data byte value, wherein the parity byte's original value resulted from exclusive OR calculations that included the original data byte value, the method comprising performing on the original parity byte value exclusive OR calculations with the original data byte value and with the new data byte value to generate an updated parity byte value.

2. Method for recalculating a parity byte value as defined in claim 1, wherein the parity byte value is an 8-bit interleaved parity code calculated over line overhead and payload envelope bytes within the frame of synchronous digital data.

3. Method for recalculating a parity byte value as defined in claim 2, wherein the original parity byte is a B2 byte in a SONET frame of synchronous digital data and the at least one changed data byte value comprises a B2 byte and an M1 byte of a prior SONET frame.

4. Method for recalculating a parity byte value as defined in claim 1, wherein the frame is a SONET data frame of data byte locations organized in nine rows and ninety columns.

5. Method for recalculating a parity byte value as defined in claim 4, wherein each data byte location comprises a plurality of interleaved data bytes.

6. Method for recalculating a parity byte value as defined in claim 5, wherein each data byte location comprises 48 interleaved data bytes from base SONET data frames forming an OC-48 SONET data frame.

7. Method for recalculating a parity byte value as defined in claim 6, wherein the B2 data byte is in row 5, column 1 of each base SONET data frame.

8. Method for recalculating a parity byte value as defined in claim 7, wherein the M1 data byte is the third data byte in the data byte location at row 9, column 2, and wherein, after multiplexing of four OC-12 data frames, the M1 data byte value is the sum of the M1 data byte values from the M1 data bytes of the four OC-12 data frames and the seventh, eleventh, and fifteenth data bytes in the data byte location at row 9, column 2 are changed from the original data byte value associated with the respective OC-12 M1 data byte to zero.

9. A synchronous communication system for multiplexing four OC-12 signals into a single OC-48 signal of framed data bytes for communication over an optical fiber link, comprising:

a byte interleave device that byte interleave multiplexes the four OC-12 signals into the OC-48 signal;

a byte processor that receives the OC-48 signal and replaces B2 and M1 data bytes of frames of the OC-48 signal based on B2 and M1 data bytes of the four OC-12 signals, wherein a new B2 byte is determined by performing, on the B2 byte's initial value, exclusive OR calculations with the initial and resulting B2 bytes of the previous frame and further with the initial and resulting M1 bytes of the previous frame.

10. A synchronous communication system as defined in claim 9, further comprising:

a serialization device that generates a serialized OC-48 signal based on the OC-48 signal processed by the byte processor;

an optical transmitter that generates an optical signal based on the serialized OC-48 data signal;

an optical fiber that receives the optical signal and transmits the optical signal to an optical receiver that converts the optical signals to serial data signals;

a deserialization interface device that converts the serial data signals to parallel data bytes and that performs frame detection; and a byte interleave demultiplex device that demultiplexes the parallel data bytes to generate four received OC-12 signals.

11. Method for multiplexing four OC-12 signals into a single OC-48 signal of framed data bytes for synchronous communication over an optical fiber link, comprising:

byte interleave multiplexing the four OC-12 signals into the OC-48 signal;

replacing B2 and M1 data bytes of frames of the OC-48 signal based on B2 and M1 data bytes of the four OC-12 signals, wherein a new B2 byte is determined by performing, on the B2 byte's initial value, exclusive OR calculations with the initial and resulting B2 bytes of the previous frame and further with the initial and resulting M1 bytes of the previous frame.

12. A method for multiplexing at least a first frame of synchronous digital data and a second frame of synchronous digital data into a combined frame of synchronous digital data, the first and second frames having a first rate and the combined frame having a second rate, wherein the second rate is an integer multiple of the first rate, and wherein the first frame comprises a first parity value calculated over a predefined portion of a prior frame of synchronous digital data having the first rate, the method comprising:

updating at least one data byte of the predefined portion of the prior frame based on the multiplexing; and determining a combined frame parity value for the combined frame by performing an exclusive OR calculation between the first parity value and an original value of the at least one data byte.

13. The method of claim 12, wherein determining further comprises performing an exclusive OR calculation between the first parity value and an updated value of the at least one data byte.

14. The method of claim 12, wherein the first parity value is an 8-bit interleaved parity code calculated over the predefined portion of the prior frame.

15. The method of claim 14, wherein the first frame and the prior frame are SONET frames, wherein the first parity value is a B2 byte in the first frame, and wherein the at least one data byte comprises an M1 byte of the prior frame.

16. The method of claim 12, wherein the prior frame and the first frame are OC-12 data frames, each comprising an M1 byte and twelve B2 bytes, wherein the combined frame is an OC-48 data frame, wherein the at least one data byte comprises the M1 byte of the prior frame, and wherein updating comprises setting the M1 byte of the prior frame to zero.

17. The method of claim 16, wherein the first parity value is a B2 byte.

18. The method of claim 12, wherein the prior frame and the first frame are OC-12 data frames, each comprising an M1 byte and twelve B2 bytes, wherein the combined frame is an OC-48 data frame, wherein the at least one data byte comprises the M1 byte of the prior frame, and wherein updating comprises updating the M1 byte of the prior frame from an original M1 value to an updated M1 value.

19. The method of claim 18, wherein the first parity value is a B2 byte, and wherein determining comprises performing an exclusive OR calculation between the first parity value, the original M1 value, and the updated M1 value.

* * * * *